Dec. 6, 1927.

E. W. TEMPLIN 1,651,742

RUNNING GEAR FOR MOTOR VEHICLES

Original Filed June 30, 1921   2 Sheets-Sheet 2

Inventor
Ellis W. Templin

By

Attorney

Patented Dec. 6, 1927.

1,651,742

UNITED STATES PATENT OFFICE.

ELLIS W. TEMPLIN, OF PHILADELPHIA, PENNSYLVANIA, ASSIGNOR TO THE GOODYEAR TIRE & RUBBER COMPANY, OF AKRON, OHIO, A CORPORATION OF OHIO.

RUNNING GEAR FOR MOTOR VEHICLES.

Original application filed June 30, 1921, Serial No. 481,519. Divided and this application filed November 11, 1925. Serial No. 68,343.

My invention relates to running gear for motor vehicles of the six-wheel type, and it has particular relation to the spring suspension mechanism thereof. More specifically my invention relates to an improvement in the construction of means for connecting the spring ends to the running gear of the vehicle.

The object of my invention is to provide a novel type of spring connection for use in vehicles of the character designated whereby the spring may be permitted to move laterally to a limited degree without interfering with the freedom of flexion of the spring or the freedom of relative movement of the several driving axle housings.

My present application is a division of my co-pending application Serial No. 481,519 filed June 30, 1921, which matured into Patent No. 1,565,526 on December 15, 1925.

Trucks of the multiple driving axle type are ordinarily provided with two front or steering wheels and four rear or driving wheels. As a truck of this type is driven around a bend, the front wheels may be turned manually by the steering mechanism, but the rear wheels, being relatively rigidly fixed, must remain substantially aligned, owing to the rigid type of spring connection between the several housings and between the individual housings and the chassis. With the rigid type of spring connection employed, any relative movement between the leading and the trailing wheels of the driving truck must necessarily be accomplished either through slippage of the wheel tires on the road surface, or through distortion of the tires on the wheels, since the wheel itself cannot be turned in a manner similar to the steering wheel.

By my invention I have eliminated this difficulty by providing a spring connection which permits of lateral displacement of one set of driving wheels with respect to the other, thus permitting them to track and eliminating, to a large extent, the distortion upon the tires.

Figure 1:
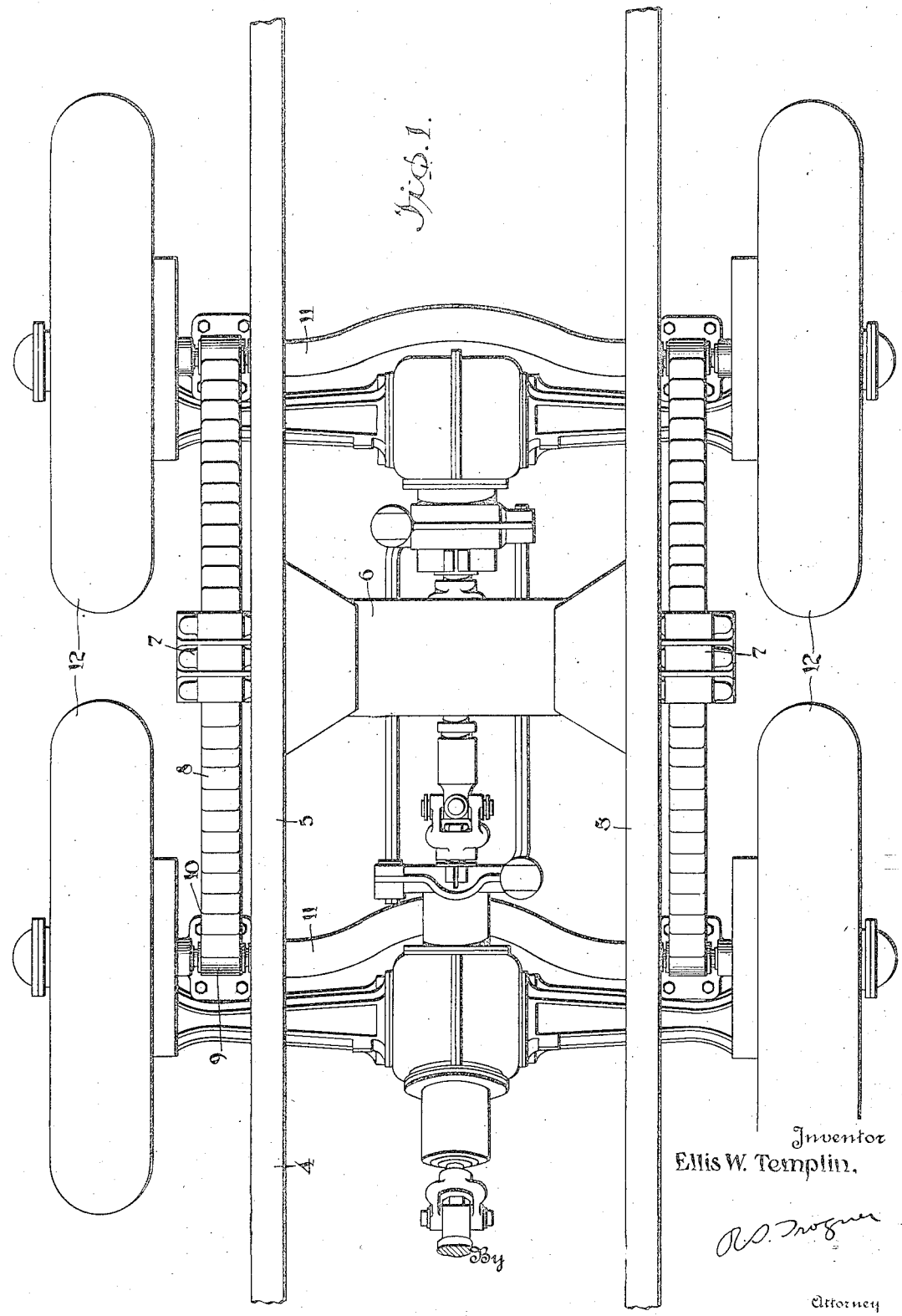
Figure 2:
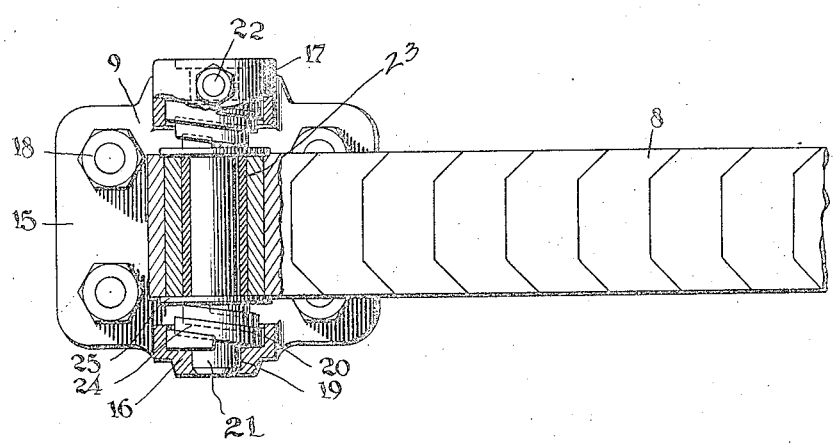
Figure 3:
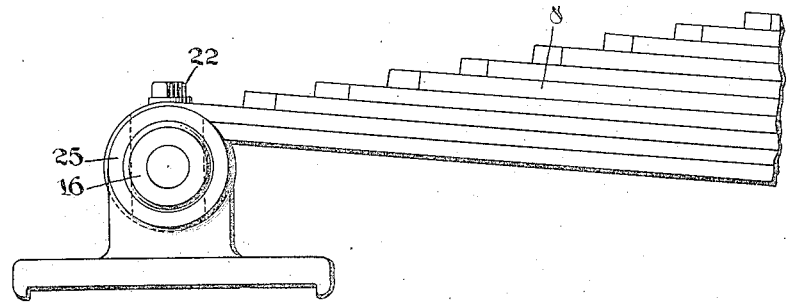

For a more detailed description of my invention, reference may now be had to the accompanying drawing, of which Fig. 1 is a plan view of the chassis of a motor vehicle embodying my invention;

Fig. 2 is a cross-sectional view of a spring end connection as employed in the structure illustrated in Fig. 1; and Fig. 3 is a side elevational view of the structure illustrated in Fig. 2.

Referring to the drawings, I have illustrated a chassis 4 consisting of two main side frames 5 connected by means of a transversely extending bracing member 6. The chassis frames 5 are each provided with a downwardly projecting lug 7 to which is pivotally secured a clip (not shown) which is secured to the central portion of the spring member 8. The ends of the spring member 8 are secured to the running gear by means of a spring end connection 9 constructed in accordance with my invention, which is mounted upon an arm 10, in turn secured upon a dead axle 11, upon which road wheels 12 are rotatably mounted.

My spring end connection 9, as best illustrated in Figs. 2 and 3, consists of a supporting block 15 provided with an upstanding lug 16 at one side thereof, and a similar lug 17 on the opposite side thereof. The member 15 is provided with a plurality of openings 18 by means of which it is secured to the supporting arm 10 by means of bolts or other suitable fastening means. The lugs 16 and 17 are each provided with a centrally disposed opening 19, the inner portion of which is materially enlarged, as indicated at 20. Disposed within the openings 19 is a bolt 21 which is held securely therein by means of a set screw 22. The ends of the two lower leaves of the spring 8 are bent into a coil in the usual manner, so as to encircle the bolt 21, being spaced therefrom by means of a bushing 23. The lugs 16 and 17 are of a sufficient distance apart that considerable lateral movement of the spring end upon the bolt 21 is permitted. Disposed within each of the enlarged openings 20, in the lugs 16 and 17, is a volute spring 24, the outer circumference of which fits snugly within the opening 20, and the inner portion of which is in frictional engagement with a plate 25 secured to the side of the end of the spring 8.

From the foregoing description it will be apparent that the end of the spring 8 may move laterally with respect to the end connection 15, but such movement will be yieldingly opposed by means of the volute spring 24 which will, at all times, tend to center the end of the spring upon the bolt 21. By this means lateral movement of one of the wheel housings with respect to the other is permitted when the truck is turning a bend, thus permitting the wheels thereof to track, but when the bend has been turned, the springs 24 will immediately serve to restore the axle unit to its original position so as to again align the tires.

Although I have illustrated but a single form of my invention and have described in detail but a single application thereof, it will be apparent to those skilled in the art that it is not so limited but that various minor modifications and changes may be made therein without departing from the spirit of my invention or from the scope of the appended claims.

What I claim is:

1. In a vehicle chassis, a relatively movable truck element including a frame provided with a plurality of wheel carrying axles, springs adapted to suspend the axles from the frame, and means connecting each spring end with one of the axles adapted to permit end thrust movement of each axle relative to said springs.

2. In a vehicle chassis, a relatively movable truck element including a frame provided with a plurality of wheel-carrying axles, springs adapted respectively to suspend the axles from the frame, and means connecting each spring end with one of the axles adapted to yieldingly permit end thrust movement of each axle relative to said springs.

3. In a vehicle chassis, a relatively movable truck element including a frame provided with a plurality of wheel-carrying axles, springs adapted respectively to suspend the axles from the frame, means connecting each spring end to one of said axles for end thrust movement relative thereto, said means including a pivotal member and means arranged to yieldingly resist such movement of the axles.

In witness whereof, I have hereunto signed my name.

ELLIS W. TEMPLIN.